United States Patent [19]

Ishii et al.

[11] 4,332,930

[45] Jun. 1, 1982

[54] PROCESS FOR POLYMERIZING FORMALDEHYDE

[75] Inventors: Takami Ishii; Naohisa Takikawa; Kiyoaki Tokunaga; Nobuhiro Ogawa, all of Ube, Japan

[73] Assignee: UBE Industries, Ltd., Japan

[21] Appl. No.: 180,306

[22] Filed: Aug. 22, 1980

[30] Foreign Application Priority Data

Aug. 23, 1979 [JP] Japan .............................. 54-106639
Jul. 15, 1980 [JP] Japan .............................. 55-95693

[51] Int. Cl.³ .............................................. C08G 4/00
[52] U.S. Cl. ................................. 528/233; 528/232; 528/236; 528/237; 528/238; 528/242; 528/243
[58] Field of Search ................ 528/232, 233, 236–238, 528/242, 243

[56] References Cited

U.S. PATENT DOCUMENTS

| | | | |
|---|---|---|---|
| 2,994,687 | 8/1961 | Goodman et al. | 528/242 |
| 3,111,503 | 11/1963 | O'Connor et al. | 528/242 |
| 4,246,396 | 1/1981 | Sukegawa et al. | 528/238 |

*Primary Examiner*—Lucille M. Phynes
*Attorney, Agent, or Firm*—Finnegan, Henderson, Farabow, Garrett & Dunner

[57] ABSTRACT

Undesirable deposition of polyoxymethylene onto the inner wall of a polymerization vessel and onto a stirrer, which deposition is observed in the slurry polymerization of formaldehyde carried out in an inert organic liquid medium in the presence of a polymerization catalyst, can be minimized by carrying out the slurry polymerization in the presence of at least one polyvalent metal salt selected from polyvalent metal salts of alkylsalicylic acids and polyvalent metal salts of dialkyl esters of sulfosuccinic acid. Optionally, a polyethylene glycol monoether may be used in addition to the polyvalent metal salt.

22 Claims, No Drawings

PROCESS FOR POLYMERIZING FORMALDEHYDE

BACKGROUND OF THE INVENTION (1) Field of the Invention

The present invention relates to a process for the slurry polymerization of formaldehyde. More particularly, it relates to a process for the slurry polymerization of formaldehyde in which undesirable deposition or built up of polyoxymethylene onto the inner wall of a polymerization vessel and a stirrer is minimized.

(2) Description of the Prior Art

A most serious disadvantage encountered in carrying out the slurry polymerization of formaldehyde in an inert organic liquid medium is that formed polyoxymethylene is deposited onto the inner wall of a polymerization vessel and onto a stirrer and, consequently, continuation of stirring and effective removal of the heat of polymerization become difficult, and it becomes necessary to stop the polymerization reaction frequently and wash the polymerization vessel and stirrer, with the result that it is impossible to conduct the continuous operation stably.

Some proposals have heretofore been made in order to eliminate the above-mentioned disadvantages caused by deposition of polyoxymethylene. For example, it has been proposed in Japanese Patent Publication No. 10,548/1971 to employ a polymerization vessel fitted with a stirring chain which is rotated to impinge against the inner wall of the polymerization vessel, thereby to peel off the polyoxymethylene deposited thereon. It also has been proposed in Japanese Patent Publication No. 3,261/1972 to blow an inert gas into the polymerization mixture during polymerization to prevent polyoxymethylene from being deposited onto the inner wall of the polymerization vessel or the stirrer.

The above-mentioned proposals are not satisfactory. That is, in the former proposal, it is impossible to uniformly peel off polyoxymethylene adhering to the inner wall of the polymerization vessel, and since the peeled blocks of polyoxymethylene are incorporated in the polymer slurry withdrawn from the polymerization vessel, after-treatments such as the terminal group-stabilizing treatment and the copolymerization are adversely affected by the presence of such peeled blocks of polyoxymethylene. When the latter method is carried out on an industrial scale, a special apparatus must be disposed and used for circulating the inert gas. Furthermore, the yield of the polymer is reduced.

SUMMARY OF THE INVENTION

It is therefore a primary object of the present invention to provide a process for the polymerization of formaldehyde in which undesirable deposition of polyoxymethylene onto the inner wall of a polymerization vessel or onto a stirrer is minimized.

In accordance with the present invention, there is provided a process for the polymerization of formaldehyde which comprises subjecting formaldehyde to slurry polymerization in an inert organic liquid medium in the presence of a polymerization catalyst and at least one polyvalent metal salt selected from the group consisting of polyvalent metal salts of alkylsalicylic acids and polyvalent metal salts of dialkyl esters of sulfosuccinic acid.

By the term "slurry polymerization" used herein is meant a polymerization wherein formed polyoxymethylene is not dissolved in the inert organic liquid medium, but is dispersed in a particle form in the inert organic liquid medium to form a slurry.

DESCRIPTION OF THE PREFERRED EMBODIMENTS

As will readily be understood from the results of Examples described hereinafter, in the present invention, deposition of polyoxymethylene onto the inner wall of a polymerization vessel and a stirrer can remarkably be reduced. Accordingly, a continuous polymerization operation can be carried out very stably. Furthermore, since the polymerization of formaldehyde is not adversely affected by the polyvalent metal salt used in the present invention, the yield of polyoxymethylene is not lowered at all by the use of the polyvalent metal salt.

It is preferred that the water content in formaldehyde to be used in the present invention be not more than 0.5% by weight, more preferably not more than 0.1% by weight.

As the inert organic liquid medium that is used in the present invention, there can be mentioned, for example, aromatic hydrocarbons such as benzene and toluene, aliphtatic hydrocarbons such as n-pentane, n-hexane and n-heptane, and alicyclic hydrocarbons such as cyclohexane and cyclopentane.

All of the compounds known to be usable as catalysts for polymerization of formaldehyde can be used in the present invention. For example, there can be used metal chelate compounds such as bis(acetylacetonato)copper, bis(3-phenylacetylacetonato)copper and tris(acetylacetonato)cobalt; amines such as butylamine, tributylamine and trihexylamine; organometallic compounds such as diethylzinc, dioleyldibutyltin, n-butyllithium and dimethylcadmium; metal carbonyl compounds such as nickel carbonyl and cobalt carbonyl; onium salts such as hexamethylene-bis(dimethyllauryl)ammonium chloride and tetrabutylammonium laurate; and carboamide compounds such as tetramethylurea and N,N'-di-isopropyl-N-acetylurea.

Among the catalysts listed above, the metal chelate compounds may preferably be used in the state of being adsorbed on polyoxymethylene in advance. When the metal chelate compounds are used in the state of being adsorbed on polyoxymethylene, deposition of polyoxymethylene onto the polymerization vessel and the stirrer can further be reduced. As the method for making the metal chelate compound adsorbed on polyoxymethylene in advance, there can be adopted, for example, a method in which the metal chelate compound is brought in contact with polyoxymethylene in an inert organic liquid medium in the presence of formaldehyde and a method in which formaldehyde is preliminarily polymerized in an inert organic liquid medium in the presence of the metal chelate compound.

The amount of the polymerization catalyst used may be varied depending upon the particular catalyst used and the purity of formaldehyde used. However, it is ordinarily preferred that the catalyst be used in an amount of from $1 \times 10^{-7}$ to $1 \times 10^{-3}$ mole per liter of the inert organic liquid medium.

As the polyvalent metal salt of the alkylsalicylic acid that is used in the present invention, there can be mentioned, for example, salts of polyvalent metals such as magnesium, copper, zinc, cadmium, aluminum, lead, chromium, molybdenum and manganese, with alkylsalicylic acids represented by the formula:

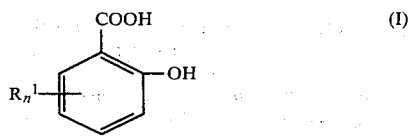

(I)

wherein $R^1$ stands for an alkyl group having 3 to 24 carbon atoms and n is an integer of from 1 to 3. Among these salts, a salt of chromium (III) with an alkylsalicylic acid of the formula (I) in which $R^1$ is an alkyl group having 14 to 18 carbon atoms and n is 1 is especially preferred.

As the polyvalent metal salt of the dialkyl ester of sulfosuccinic acid that is used in the present invention, there can be mentioned, for example, salts of polyvalent metals such as calcium, magnesium, copper, zinc, cadmium, aluminum, lead, chromium, molybdenum and manganese, with dialkyl esters of sulfosuccinic acid represented by the formula:

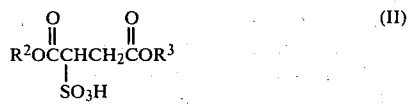

(II)

wherein $R^2$ and $R^3$ each stand for an alkyl group having 3 to 18 carbon atoms. Among these salts, a calcium salt of di-2-ethylhexyl sulfosuccinate, that is, a compound of the formula (II) in which each of $R^2$ and $R^3$ is an alkyl group having 8 carbon atoms, is especially preferred.

These polyvalent metal salts may be used alone. However, when two or more of these polyvalent metal salts are used in combination, better results are obtained.

It is preferred that the polyvalent metal salt be used in an amount of 0.1 to 50 mg, more preferably 0.5 to 30 mg, per liter of the inert organic liquid medium. When the amount of the polyvalent metal salt used is too small, the amount of polyoxymethylene deposited onto the polymerization vessel and stirrer cannot be reduced to the desired extent. Even if the amount of the polyvalent metal salt used is larger than the above-mentioned upper limit, the effect of reducing the deposition of polyoxymethylene onto the polymerization vessel and stirrer is not particularly enhanced and the formed polyoxymethylene tends to discolor.

Even if a metal salt of a fatty acid, other than the polyvalent metal salt of the present invention, is used in a large amount, deposition of polyoxymethylene onto the inner wall of the polymerization vessel and the stirrer cannot be reduced to the desired extent (see Comparative Example 7 presented hereinafter).

The polyvalent metal salt may be used in combination with a polymeric electrolyte. As the polymeric electrolyte, there can be mentioned copolymers of unsaturated carboxylic acids or substitution products thereof, such as stearyl methacrylate/methacrylic acid copolymers and β-hydroxyethyl methacrylate/stearyl methacrylate/methacrylic acid copolymers; and homopolymers of organic bases and copolymer of organic bases with unsaturated carboxylic acids or substitution products thereof, such as ethylene-imine polymers, 2-methyl-5-vinylpyridine polymers and 2-methyl-5-vinylpyridine/lauryl methacrylate/stearyl methacrylate copolymers. Among these polymeric electrolytes, there is preferably used a copolymer of 2-methyl-5-vinylpyridine with an alkyl ester of methacrylic acid having 16 to 18 carbon atoms in the alkyl group.

It is preferred that the polymeric electrolyte be used in an amount of 0.5 to 2 parts by weight per part by weight of the polyvalent metal salt.

It now has been found that, when the slurry polymerization of formaldehyde is conducted in the presence of, in addition to the above-mentioned polyvalent metal salt, a polyethylene glycol monoether represented by the formula:

$$R^4\text{-}(OCH_2CH_2)_m OH \qquad \text{(III)}$$

wherein $R^4$ stands for an alkyl, alkenyl or alkylaryl group having 10 to 20 carbon atoms and m is a number of from 2 to 10, the deposition of polyoxymethylene onto the inner wall of a polymerization vessel and a stirrer can be far more reduced than in the case where the polyvalent metal salt is used alone. It is to be noted that, if the polyethylene glycol monoether of the formula (III) is used alone, the deposition of polyoxymethylene onto the inner wall of the polymerization vessel and the stirrer cannot be prevented (see Comparative Example 9 presented hereinafter).

As specific examples of the polyethylene glycol monoether represented by the formula (III), there can be mentioned polyethylene glycol monolauryl ether, polyethylene glycol monopentadecyl ether, polyethylene glycol monohexadecyl ether, polyethylene glycol monostearyl ether, polyethylene glycol mono-oleyl ether, polyethylene glycol mononoylphenyl ether and polyethylene glycol monolaurylphenyl ether. It is preferred that the HLB value of the polyethylene glycol monoether be in the range of from 5 to 15, more preferably from 8 to 13.

It is preferred that the polyethylene glycol monoether be used in an amount of 1 to 500 mg, more preferably 5 to 100 mg, per liter of the inert organic liquid medium. When the amount of the polyethylene glycol monoether used is too small, the amount of polyoxymethylene deposited onto the polymerization vessel and stirrer is undesirably large. Even if the polyethylene glycol monoether is used in an amount exceeding the above-mentioned upper limit, the effect of reducing the deposition of polyoxymethylene is not particularly enhanced.

The ratio of the polyvalent metal salt to the polyethylene glycol monoether is not particularly critical, but ordinarily, the polyethylene glycol monoether is used in an amount of 1 to 200 parts by weight per part by weight of the polyvalent metal salt.

The time at which the polyvalent metal salt and the optional polyethylene glycol monoether are added to the polymerization reaction system is not particularly critical. They may be added to the inert organic liquid medium either prior to or simultaneously with initiation of the polymerization reaction. Furthermore, they may be added in an appropriate stage after the polymerization reaction has been initiated.

The slurry polymerization of formaldehyde in the present invention may be carried out in manners similar to those employed in conventional slurry polymerization of formaldehyde, except that the specified polyvalent metal salt and the optional, specified polyethylene glycol monoether are used in the present invention.

As the polymerization method, there can be adopted, for example, a solution polymerization method in which formaldehyde is dissolved in the inert organic liquid medium and the polymerization catalyst is added to the resulting solution to effect polymerization, and a blow polymerization method in which formaldehyde is continuously blown into the inert organic liquid medium in the presence of the polymerization catalyst.

A temperature at which polyoxymethylene formed by the polymerization is not dissolved in the inert organic liquid medium may be adopted as the polymerization temperature. From the industrial viewpoint, it is preferred that a temperature ranging from $-20°$ to $80°$ C. be adopted for the polymerization.

The polymerization pressure is not particularly critical in the present invention, but ordinarily, the polymerization is carried out under a pressure of from atmospheric pressure to 5 kg/cm$^2$.

The present invention will now be described with reference to the following Examples and Comparative Examples, wherein % is by weight unless otherwise specified.

EXAMPLE 1

A n-heptane solution containing the following polymerization catalyst (1) and polyvalent metal salt-containing solution (2) was prepared.
Polymerization Catalyst (1):
  $5 \times 10^{-6}$ mole of bis(acetylacetonato) copper per liter n-heptane.
Polyvalent Metal Salt-containing Solution (2):
  3 mg. per liter of n-heptane, of a solution comprising 20% of a chromium (III) alkylsalicylate (hereinafter referred to as "salt A") in which $R^1$ of the formula (I) is an alkyl group having 14 to 18 carbon atoms and n is 1, 10% of a calcium salt of a dialkyl ester of sulfosuccinic acid (hereinafter referred to as "salt B") in which each of $R^2$ and $R^3$ of the formula (II) is a 2-ethylhexyl group, 45% of a copolymer of 2-methyl-5-vinylpyridine with an alkyl ester of methacrylic acid having 17 carbon atoms in the alkyl group and 25% of xylene.

A 200 ml volume flask equipped with a stirrer, a thermometer, a formaldehyde-blowing nozzle, an n-heptane solution feed inlet and a polymer slurry discharge outlet was charged with 200 ml of the above-mentioned n-heptane solution.

Under agitation, the above-mentioned n-heptane solution was continuously fed into the flask at a rate of 20 ml/min. and also gaseous formaldehyde (water content=0.01%) was continuously fed into the flask at a rate of 1 g/min., and the continuous polymerization was conducted at 50° C. for 24 hours while continuously withdrawing formed polyoxymethylene in the form of a slurry, so that the liquid level was kept constant.

The yield of the polymer was about 100% based on formaldehyde blown into the flask, and the intrinsic viscosity of formed polyoxymethylene was 5.5 dl/g as measured at 60° C. on a polymer solution in p-chlorophenol containing 2% of α-pinene.

After completion of the polymerization reaction, the content in the flask was discharged, and the weight of polyoxymethylene deposited onto the inner wall of the flask and the stirrer (hereinafter referred to as "deposition amount") was measured. The deposition amount was 0.32 g.

COMPARATIVE EXAMPLE 1

Formaldehyde was polymerized in the same manner as described in Example 1, except that the polyvalent metal salt-containing solution (2) was not incorporated in n-heptane, i.e., only bis(acetylacetonato)copper was incorporated in n-heptane.

When 3 hours had passed from the start of the polymerization reaction of the stirrer became impossible because of extremely increased deposition of polyoxymethylene onto the inner wall of the flask and the stirrer.

The intrinsic viscosity of formed polyoxymethylene was 5.5 dl/g and the deposition amount was 4.50 g.

EXAMPLE 2

Formaldehyde was polymerized for 24 hours in the same manner as described in Example 1, except that 3 mg/l of the salt A instead of the polyvalent metal salt-containing solution (2) was dissolved in n-heptane.

The intrinsic viscosity of formed polyoxymethylene was 5.4 dl/g and the deposition amount was 0.37 g.

EXAMPLE 3

Formaldehyde was polymerized for 24 hours in the same manner as described in Example 1, except that 30 mg/l of the salt B instead of the polyvalent metal salt-containing solution (2) was dissolved in n-heptane.

The intrinsic viscosity of formed polyoxymethylene was 5.4 dl/g and the deposition amount was 0.40 g.

EXAMPLE 4

Formaldehyde was polymerized for 24 hours in the same manner as described in Example 1, except that $5 \times 10^{-6}$ mole/l of bis(3-phenylacetylacetonato)copper instead of bis(acetylacetonato) copper was dissolved in n-heptane.

The intrinsic viscosity of formed polyoxymethylene was 4.5 dl/g and the deposition amount was 0.38 g.

COMPARATIVE EXAMPLE 2

Formaldehyde was polymerized in the same manner as described in Example 4, except that the polyvalent metal salt-containing solution (2) was not incorporated in n-heptane, i.e., only bis(3-phenylacetylacetonato)-copper was incorporated in n-heptane.

When 2.5 hours had passed from the start of the reaction, stirring became impossible because of extremely increased deposition of formed polyoxymethylene onto the inner wall of the flask and the stirrer.

The intrinsic viscosity of formed polyoxymethylene was 4.5 dl/g and the deposition amount was 5.10 g.

EXAMPLE 5

Formaldehyde was polymerized for 24 hours in the same manner as described in Example 1 except that $1 \times 10^4$ mole/l of tris(acetylacetonato)cobalt instead of bis(acetylacetonato)copper was dissolved in n-heptane.

The intrinsic viscosity of formed polyoxymethylene was 5.2 dl/g and the deposition amount was 0.55 g.

COMPARATIVE EXAMPLE 3

Formaldehyde was polymerized in the same manner as described in Example 5, except that the polyvalent metal salt-containing solution (2) was not incorporated in n-heptane, i.e., tris(acetylacetonato)cobalt was incorporated in n-heptane.

When 2.5 hours had passed from the start of the reaction, stirring became impossible because of increased deposition of formed polyoxymethylene.

The intrinsic viscosity of formed polyoxymethylene was 5.2 dl/g and the deposition amount was 4.80 g.

EXAMPLE 6

Formaldehyde was polymerized for 24 hours in the same manner as described in Example 1, except that $5 \times 10^{-6}$ mole/l of dibutyldioleyltin instead of bis(acetylacetonato)copper was dissolved in n-heptane.

The intrinsic viscosity of formed polyoxymethylene was 5.0 dl/g and the deposition amount was 0.65 g.

COMPARATIVE EXAMPLE 4

Formaldehyde was polymerized in the same manner as described in Example 6, except that the polyvalent metal salt-containing solution (2) was not incorporated in n-heptane, i.e., only dibutyldioleyltin was incorporated in n-heptane.

When 3 hours had passed from the start of the polymerization reaction, stirring became impossible because of increased deposition of polyloxymethylene.

The intrinsic viscosity of formed polyoxymethylene was 5.0 dl/g and the deposition amount was 4.50 g.

EXAMPLE 7

Formaldehyde was polymerized for 24 hours in the same manner as described in Example 1, except that $1 \times 10^4$ mole/l of tri-n-butylamine instead of bis(acetylacetonato)copper was dissolved in n-heptane.

The intrinsic viscosity of formed formaldehyde was 1.7 dl/g and the deposition amount was 0.53 g.

COMPARATIVE EXAMPLE 5

Formaldehyde was polymerized in the same manner as described in Example 7, except that polyvalent metal salt-containing solution (2) was not incorporated in n-heptane, i.e., only tri-n-butylamine was incorporated in n-heptane.

When 2.5 hours had passed from the start of the polymerization reaction, stirring became impossible because of increased deposition of polyoxymethylene.

The intrinsic viscosity of formed polyoxymethylene was 1.7 dl/g and the deposition amount was 3.90 g.

EXAMPLE 8

Formaldehyde was polymerized for 24 hours in the same manner as described in Example 1, except that $1 \times 10^4$ mole/l of diethylzinc instead of bis(acetylacetonato) copper ws dissolved in n-heptane.

The intrinsic viscosity of formed polyoxymethylene was 2.7 dl/g and the deposition amount was 0.52 g.

COMPARATIVE EXAMPLE 6

Formaldehyde was polymerized in the same manner as described in Example 8, except that the polyvalent metal salt-containing solution (2) was not incorporated in n-heptane, i.e., only diethylzinc was incorporated in n-heptane.

When 2.5 hours had passed from the start of the polymerization reaction, stirring became impossible because of increased deposition of polyoxymethylene.

The intrinsic viscosity of formed polyoxymethylene was 2.7 dl/g and the deposition amount was 4.20 g.

EXAMPLE 9

Formaldehyde was polymerized for 24 hours in the same manner as described in Example 1, except that 50 ml/l of calcium di-isopropylsalicylate instead of the polyvalent metal salt-containing solution (2) was dissolved in n-heptane.

The intrinsic viscosity of formed polyoxymethylene was 5.5 dl/g and the deposition amount was 0.63 g.

COMPARATIVE EXAMPLE 7

Formaldehyde was polymerized in the same manner as described in Example 1, except that 100 mg/l of magnesium oleate instead of the polyvalent metal salt-containing solution (2) was dissolved in n-heptane.

When 12 hours had passed from the start of the polymerization reaction, stirring became impossible because of increased deposition of polyoxymethylene.

The intrinsic viscosity of formed polyoxymethylen was 5.2 dl/g and the deposition amount was 1.06 g.

EXAMPLE 10

Formaldehyde was polymerized in the same manner as described in Example 1, except that polyethylene glycol monostearyl ether (HLB value = 10.7), where $R^4$ of the formula (III) was a stearyl group and m was approximately 7, was incorporated in n-heptane in an amount of 10 mg/liter of the n-heptane, in addition to the bis(acetylacetonato)copper polymerization catalyst (1) and the polyvalent metal salt-containing solution (2).

The yield of formed polyoxymethylene was about 100%, the intrinsic viscosity of the polyoxymethylene was 5.5 dl/g and the deposition amount was 0.13 g.

COMPARATIVE EXAMPLE 8

Formaldehyde was polymerized in the same manner as described in Example 10, except that the polyvalent metal salt-containing solution was not incorporated into n-heptane, i.e., only the polymerization catalyst and the polyethylene glycol monostearyl ether were incorporated in n-heptane.

When 3 hours had passed from the start of the polymerization reaction, rotation of the stirrer became impossible because of extremely increased deposition of polyoxymethylene onto the inner wall of the flask and the stirrer.

The intrinsic viscosity of formed polyoxymethylene was 5.0 dl/g and the deposition amount was 4.45 g.

EXAMPLE 11 TO 14

Formaldehyde was polymerized for 24 hours in the same manner as described in Example 10, except that a polyethylene glycol monoether shown in Table 1, below, was incorporated in an amount of 10 mg/liter into n-heptane instead of the polyethylene glycol monostearyl ether used in Example 10.

The obtained results are shown in Table 1, below.

TABLE 1

| Example No. | Polyethylene Glycol Monoether | | | Intrinsic Viscosity of Polymer (dl/g) | Deposition Amount (g) |
| --- | --- | --- | --- | --- | --- |
| | $R^4$ | m | HLB Value | | |
| 11 | lauryl | 5 | 10.8 | 5.5 | 0.10 |
| 12 | tridecyl | 5 | 10.5 | 5.4 | 0.10 |
| 13 | oleyl | 5 | 8.9 | 5.2 | 0.13 |
| 14 | nonylphenyl | 8 | 12.3 | 5.2 | 0.18 |

EXAMPLE 15

Formaldehyde was polymerized for 24 hours in the same manner as described in Example 10, except that 3 mg/l of the salt A was incorporated in n-heptane instead of the polyvalent metal salt-containing solution (2).

The intrinsic viscosity of formed polyoxymethylene was 5.4 dl/g and the deposition amount was 0.13 g.

EXAMPLE 16

Formaldehyde was polymerized for 24 hours in the same manner as described in Example 10, except that 3 ml/l of the salt B was dissolved in n-heptane instead of the polyvalent metal salt-containing solution (2).

The intrinsic viscosity of formed polyoxymethylene was 5.4 dl/g and the deposition amount was 0.18 g.

EXAMPLES 17 TO 20

Formaldehyde was polymerized for 24 hours in the same manner as described in Example 11, except that a predetermined amount of a polymerization catalyst shown in Table 2, below, was used instead of bis-(acetylacetonate)copper.

The obtained results are shown in Table 2, below.

TABLE 2

| Example No. | Polymerization Catalyst Name | Concentration (mole/l) | Intrinsic Viscosity of Polymer (dl/g) | Deposition Amount (g) |
|---|---|---|---|---|
| 17 | bis(3-phenylacetyl-acetonato)copper | $5 \times 10^{-6}$ | 4.7 | 0.12 |
| 18 | tris(acetylacetonato)cobalt | $1 \times 10^{-4}$ | 5.2 | 0.17 |
| 19 | dibutyldioleyltin | $5 \times 10^{-6}$ | 5.0 | 0.20 |
| 20 | diethylzinc | $1 \times 10^{-4}$ | 2.6 | 0.20 |

EXAMPLE 21

Formaldehyde was polymerized for 24 hours in the same manner as described in Example 10, except that 50 mg/l of calcium di-isopropylsalicylate was incorporated in n-heptane instead of the polyvalent metal salt-containing solution (2).

The intrinsic viscosity of formed polyoxymethylene was 5.5 dl/g and the deposition amount was 0.27 g.

EXAMPLE 22

Gaseous formaldehyde (water content=0.01%) was blown at a rate of 1.0 g/min per liter of n-heptane into n-heptane containing $5 \times 10^{-5}$ mole of bis-(acetylacetonato)copper per liter of n-heptane at 50° C., for 11 minutes, to adsorb the bis(acetylacetonato)copper in the formed polyoxymethylene. In the resulting slurry, the polymer was contained in an amount of 10.0 g per liter of n-heptane and bis(acetylacetonato)copper was contained in amount of $1 \times 10^6$ mole per liter of n-heptane. Accordingly, bis(acetylacetonato)copper was adsorbed in an amount of $4.9 \text{ g} \times 10^6$ mole per gram of the polymer.

A polyvalent metal salt-containing solution similar to that used in Example 11 was incorporated in the so obtained polymerization catalyst slurry in an amount of 3 mg per liter of n-heptane, and polyethylene glycol monolauryl ether similar to that used in Example 11 was further incorporated in an amount of 10 mg per liter of n-heptane.

Formaldehyde was polymerized for 24 hours in the same manner as described in Example 11, except that the so obtained n-heptane slurry was used instead of the n-heptane solution used in Example 11.

The intrinsic viscosity of formed polyoxymethylene was 5.5 dl/g and the deposition amount was 0.05 g.

We claim:

1. A process for polymerizing formaldehyde which comprises subjecting formaldehyde to slurry polymerization in an inert organic liquid medium in the presence of a polymerization catalyst and at least one polyvalent metal salt selected from the group consisting of polyvalent metal salts of alkylsalicylic acids and polyvalent metal salts of dialkyl esters of sulfosuccinic acid.

2. A process according to claim 1, wherein the alkylsalicylic acids are represented by the formula (I):

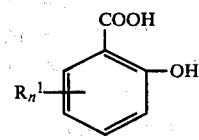

wherein $R^1$ stands for an alkyl group having 3 to 24 carbon atoms and n is an integer of from 1 to 3.

3. A process according to claim 2, wherein the polyvalent metal salt of an alkylsalicylic acid is a salt of chromium (III) with an alkylsalicylic acid of the formula (I) in which $R^1$ is an alkyl group having 14 to 18 carbon atoms and n is 1.

4. A process according to claim 1, wherein the dialkyl esters of sulfosuccinic acid are represented by the formula (II):

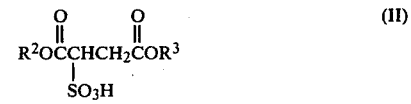

wherein $R^2$ and $R^3$ each stand for an alkyl group having 3 to 18 carbon atoms.

5. A process according to claim 4, wherein the polyvalent metal salt of a dialkyl ester of sulfosuccinic acid is calcium di-2-ethylhexyl sulfosuccinate.

6. A process according to any one of claims 1, 2 and 4, wherein the at least two polyvalent metal salts are used.

7. A process according to any one of claims 1, 2 and 4, wherein the amount of the polyvalent metal salt is in the range of from 0.1 to 50 mg per liter of the inert organic liquid medium.

8. A process according to any one of claims 1, 2 and 4, wherein the amount of the polyvalent metal salt is in the range of from 0.5 to 30 mg per liter of the inert organic liquid medium.

9. A process according to any one of claims 1, 2 and 4, wherein the polyvalent metal salt is used in combination with 0.5 to 2 parts by weight of a polymeric electrolyte per part by weight of the polyvalent metal salt.

10. A process according to any one of claims 1, 2 and 4, wherein the slurry polymerization is carried out in the presence of, in addition to the polymerization catalyst and the polyvalent metal salt, a polyethylene glycol monoether represented by the formula (III):

wherein $R^4$ stands for an alkyl, alkenyl or alkylaryl group having 10 to 20 carbon atoms and m is a number of from 2 to 10.

11. A process according to claim 10, wherein the polyethylene glycol monoether has a HLB of from 5 to 15.

12. A process according to claim 10, wherein the amount of the polyethylene glycol monoether is in the range of from 1 to 500 mg per liter of the inert organic liquid medium.

13. A process according to claim 10, wherein the amount of the polyethylene glycol monoether is in the range of from 1 to 200 parts by weight per part by weight of the polyvalent metal salt.

14. A process according to any one of claims 1, 2 and 4, wherein the formaldehyde to be polymerized contains not more than 0.5% by weight of water.

15. A process according to any one of claims 1, 2 and 4, wherein the inert organic liquid medium is a liquid hydrocarbon which is incapable of dissolving formed polyoxymethylene therein at the polymerization temperature employed.

16. A process according to any one of claims 1, 2 and 4, wherein the polymerization catalyst is selected from the group consisting of metal chelate compounds, amines, organometallic compounds, metal carbonyl compounds, onium salts and carboamide compounds, and used in an amount of from $1 \times 10^7$ to $1 \times 10^3$ mole per liter of the inert organic liquid medium.

17. A process according to claim 16, wherein the polymerization catalyst is a metal chelate compound in the state of being adsorbed on polyoxymethylene.

18. A process according to any one of claims 1, 2 and 4, wherein the slurry polymerization is effected by a solution polymerization method in which formaldehyde is dissolved in the inert organic liquid medium and the polymerization catalyst is added to the resulting solution.

19. A process according to any one of claims 1, 2 and 4, wherein the slurry polymerization is effected by a blow polymerization method in which formaldehyde is continuously blown into the inert organic liquid medium in the presence of the polymerization catalyst.

20. A process according to any one of claims 1, 2 and 4, wherein the slurry polymerization is carried out at a temperature of from $-20°$ to $80°$ C.

21. A process according to any one of claims 1, 2 and 4, wherein the slurry polymerization is carried out under a pressure of from atmospheric pressure to 5 kg/cm$^2$.

22. A process according to claim 2 wherein the polyvalent metal is selected from the group consisting of magnesium, copper, zinc, cadmium, lead, chromium, molybdenum and manganese.

* * * * *